May 1, 1951          A. L. FIELD          2,551,431
FISHING BOAT
Filed Jan. 13, 1948          2 Sheets—Sheet 1
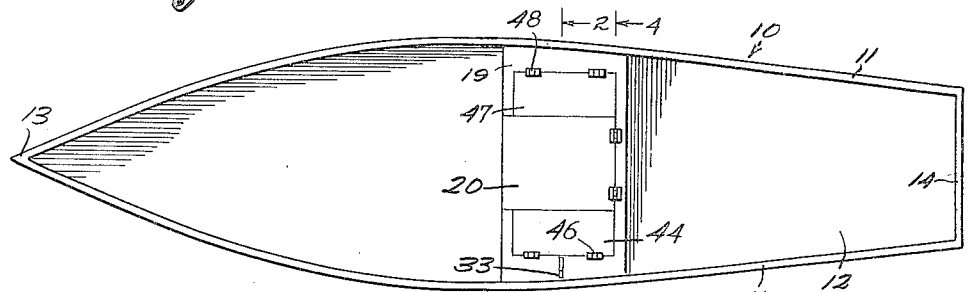
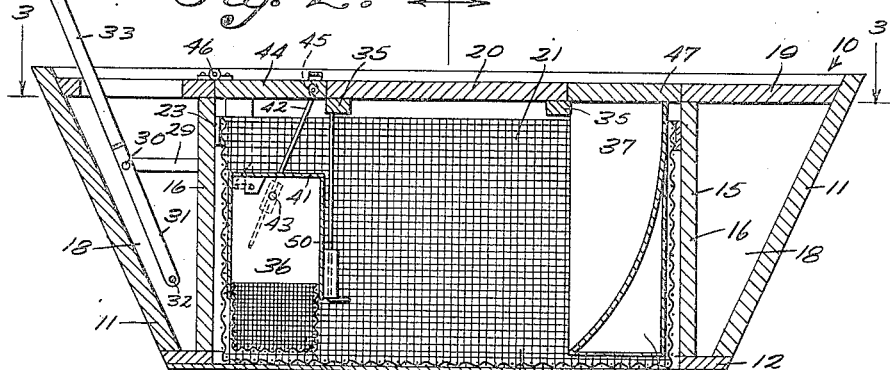
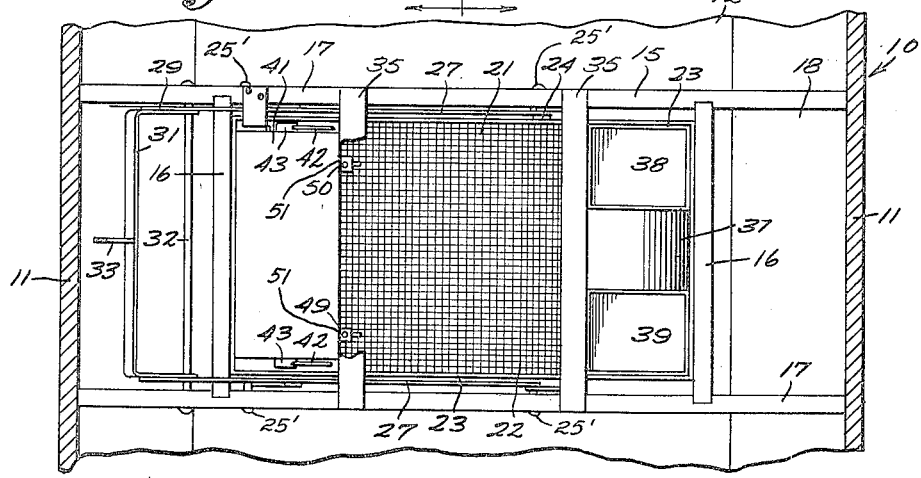
INVENTOR.
Alfred L. Field,
BY Victor J. Evans & Co.
ATTORNEYS May 1, 1951

A. L. FIELD 2,551,431

FISHING BOAT

Filed Jan. 13, 1948

INVENTOR.
Alfred L. Field,
BY Victor J. Evans & Co.
ATTORNEYS

Patented May 1, 1951

2,551,431

UNITED STATES PATENT OFFICE 2,551,431

FISHING BOAT

Alfred Lester Field, Union Springs, N. Y.

Application January 13, 1948, Serial No. 1,991

1 Claim. (Cl. 9—1)

The invention relates to a boat and more especially to a fishing boat.

The primary object of the invention is the provision of a boat of this character, wherein its body is of the flat bottom type, and amidship is arranged a seat forming therein a compartment or well having within a raising and lowering receptacle fitted with bait holders, and this receptacle receives fish when caught and such receptacle is of a construction to assure a healthy condition to both the fish and the bait held within the holders. The body of the boat may also be of the round bottom type having a portion thereof flattened to receive the bait holders.

Another object of the invention is the provision of a boat of this character, wherein the bait holders are susceptible of being raised and lowered within the storage receptacle, which is also adjustably suspended so that it can be lowered in the well for circulation of water therein, without the water reaching a level for its flow into the body of the boat, the receptacle and the holders being readily accessible for the introducing of the bait within the holders or the removal of such bait therein contained.

A further object of the invention is the provision of a boat of this character wherein the storage receptacle for the fish caught in the use of the boat is concealed from view, being confined within a seat built within the body of said boat, and this seat has a lid enabling easy access to the well or the receptacle therein, the bait holders being within the storage receptacle and are conveniently accessible at will.

A further object of the invention is the provision of a boat of this character, wherein the receptacle for the storage of fish therein, when lowered below the bottom of the boat to be partially submerged in water, will be shielded, so as to protect the fish contained therein from water impact, and also avoids retarding the travel of the boat when afloat and being advanced in a body of water.

A still further object of the invention is the provision of a boat of this character, wherein the storage receptacle is made from a reticulated material so that water can freely flow therein and circulate within for maintaining fish trapped therein in a healthy condition and alive, this being also true with respect to bait, particularly live bait contained within the holders therefor.

A still further object of the invention is the provision of a boat of this character, which is simple in its construction, thoroughly reliable and efficient in operation, novel in construction, assured sanitary and inexpensive to manufacture.

With these and other objects in view, the invention consists in the features of construction, combination and arrangement of parts as will be hereinafter more fully described in detail, illustrated in the accompanying drawings which disclose the preferred and modified forms of the invention and pointed out in the claim hereunto appended.

In the accompanying drawings:

Figure 1 is a top plan view of a boat constructed in accordance with the invention;

Figure 2 is an enlarged sectional view taken on the line 2—2 of Figure 1 looking in the direction of the arrows;

Figure 3 is a fragmentary sectional view taken on the line 3—3 of Figure 2 looking in the direction of the arrows;

Figure 4 is a sectional view on the line 4—4 of Figure 1 looking in the direction of the arrows;

Figure 5 is a sectional view on the line 5—5 of Figure 2 looking in the direction of the arrows; and Figure 6 is a sectional view on the line 6—6 of Figure 2 looking in the direction of the arrows.

Similar reference characters indicate corresponding parts throughout the several views in the drawings.

Referring to the drawings in detail, the reference numeral 10 designates generally the boat constructed in accordance with the invention and comprises a body 11, being the shell of the boat having a flat bottom 12, the shape of the said body or shell being conventional with a pointed bow 13 and a blunt or straight stern 14 respectively. Built within the body or shell 10 amidship is a seat frame 15 which, as shown, is closed on all sides, the ends 16 of the said frame being interfitted with the opposite side walls 17, and between the ends 16 and the sides adjacent thereto of the body or shell 11 are formed pockets 18. However, if it is desired, the end piece 16 may be omitted to provide a somewhat open seat frame 15. The seat frame 15 opens through the flat bottom 12 of the body or shell 11, and the top of this frame is open, being closed by seat frame 19 having a hinged lid or cover 20 constituting the seat proper. The frame 19 closes the pockets 18, being extended from one side to the other of the body or shell of the boat 10.

The seat frame 15 constitutes an open well 21 and accommodated within the well 21 is a storage receptacle 22 made of reticulated material for receiving fish caught by a user of the boat, the receptacle being susceptible of adjustment vertically so that it can be lowered from within the well 21 into a body of water on which the boat is afloat so that such water can circulate therethrough, maintaining the fish trapped therein alive or in a healthy condition, the water being let in by the reticulated material of which said receptacle is made.

The receptacle is secured at its upper edge to a rectangular shaped frame 23. Pivotally secured to the frame 23, on both sides thereof, are the links 24, to which are pivoted bell crank levers 25, and the levers 25 are pivoted at 26 to a link 27 which is pivoted at 28 to the links 29, pivoted at 30 to the fork 31, which is pivoted on the rod 32 extending transversely of the frame 15 and mounted in the side walls 17, and a handle 33 is provided at the medial portion of the fork 31 for the lowering and raising of the receptacle 22. The link 29 extends through the opening 34 in one of the end walls 16 for the operation thereof.

In the movement of the receptacle in relation to the boat bottom the fork 31 of the lever 33 is moved inwardly in the body on the fixed rod 32. The links 29 are free to pivot on the moving pivots 30 and link 27 will cause the bell crank levers 25 to move on the pivots 25' that are fixed in the side walls 17 see Fig. 3. The movement of the levers 25 causing the downward movement of the links 24 on the moving pivots 24' at their pivot points on the frame 23 and the moving pivots 24" at the moving pivotal connection of one of the arms of the levers 25 and the links 24, while the other arm of the levers 25 pivots on the moving pivot 26. The opening 34 gives sufficient play to permit the movement of the links 29 to allow the pivotal action described and the lowering and raising of the frame 23 and the receptacle carried by the frame.

When the receptacle 22 is in a raised position, easy access can be had thereto on the opening of the lid or cover 20 which, in closed position, rests on the crossbars 35.

Located within the receptacle 22 is a pair of bait holders 36 and 37 respectively, the latter having permanently closed bottom compartments 38 and 39, or compartment 39 may be provided with a perforated bottom, while the holder 36 has the reticulated or perforated bottom 40 and a pivoted lid 41. The holder 36 is suspended by hanger rods 42, or chains may be used instead of the rods, the rods being pivoted thereto and to a hinged lid 44 at 45, the lid being hinged at 46 to the frame 19, and the holder 37 is accessible through swinging door 47 hinged at 48 to the frame 19, and both doors 44 and 47 are directly over the points of location of the holders 36 and 37. One of the holders is for worms while the other is for minnows, crabs, or other bait. The holder 36 is provided with loop guides 49 for guiding the upward movement of the said holder by means of engagement with vertical rods 50 secured to one of the crossbars 35 by brackets.

The holder 36 is manually lifted and during such action the guides 49 slide on the fixed rods 50 until the guides 49 engage the cross bar 35 at which time access can then be had to the holder 51.

Arranged below the bottom 12 of the boat body or shell 11 and in alinement with the well 21 is a shield or deflector plate 52, being secured to the bottom of the receptacle 22, and receivable in slots 53 in the bottom 12 of the shell 11, and this shield or plate 52 extends outwardly of the receptacle 22 for a short distance to completely close the bottom of the well 21. The shield or plate 52 protects the fish within the receptacle 22 from water impact and also relieves the boat from retardation in the travel thereof in a body of water or seepage of water into the well, the shield or plate 52 making contact with the flat bottom 12 of the shell or body 11 when the receptacle 22 is raised within the well 21 when at full elevated extent.

The plate 52 by its construction does not retard progress of the boat when traveling in a body of water, and fully shields the receptacle 22 and closes the well 21.

There has thus been provided a boat which will accomplish the objects of the invention, and it is believed that from the foregoing description, the construction and operation thereof will be apparent to those skilled in the art, and it is also to be understood that changes in the details of construction, arrangement and combination of parts may be resorted to, provided they fall within the spirit of the invention and the scope of the appended claim.

What is claimed is:

A boat comprising a body having a seat frame forming a well opening vertically through the said body, a reticulated receptacle adjustably accommodated within said well and a cover for said frame and giving access to the receptacle within the well, a guard secured to the bottom of said receptacle, means for raising and lowering the receptacle said means comprising a manually operated lever having a fork on the lower end thereof, links pivoted to said fork, links pivoted to said receptacle and bell crank levers connected to the links pivoted to said fork and the links pivoted to said receptacle.

ALFRED LESTER FIELD.

REFERENCES CITED

The following references are of record in the file of this patent:

UNITED STATES PATENTS

| Number | Name | Date |
|---|---|---|
| 28,979 | Gerard | July 3, 1860 |
| 415,797 | Sindle | Nov. 26, 1889 |
| 435,211 | Darrah | Aug. 26, 1890 |
| 2,075,594 | Throndsen | Mar. 30, 1937 |
| 2,169,941 | Campbell | Aug. 15, 1939 |
| 2,203,565 | Field | June 4, 1940 |